(12) United States Patent
Schuller et al.

(10) Patent No.: US 8,382,459 B2
(45) Date of Patent: Feb. 26, 2013

(54) PISTON PUMP WITH IMPROVED PISTON

(75) Inventors: Wolfgang Schuller, Cleebronn (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 1248 days.

(21) Appl. No.: 12/065,951

(22) PCT Filed: Aug. 25, 2006

(86) PCT No.: PCT/EP2006/065686
§ 371 (c)(1),
(2), (4) Date: Mar. 6, 2008

(87) PCT Pub. No.: WO2007/028728
PCT Pub. Date: Mar. 15, 2007

(65) Prior Publication Data
US 2008/0226479 A1 Sep. 18, 2008

(30) Foreign Application Priority Data
Sep. 6, 2005 (DE) .......................... 10 2005 042 197

(51) Int. Cl.
*F04B 19/00* (2006.01)
*F16J 1/00* (2006.01)
(52) U.S. Cl. ........................... 417/470; 417/549; 92/172
(58) Field of Classification Search ............ 417/470, 417/549, 555.1, 554; 92/172
See application file for complete search history.

(56) References Cited

U.S. PATENT DOCUMENTS

| 5,980,214 | A | 11/1999 | Djordjevic | |
|---|---|---|---|---|
| 6,276,909 | B1 | 8/2001 | Siegel et al. | |
| 6,302,663 | B1 * | 10/2001 | Schuller et al. | 417/554 |
| 6,341,950 | B1 | 1/2002 | Schuller et al. | |
| 6,471,496 | B1 * | 10/2002 | Merklein et al. | 417/569 |
| 7,278,835 | B2 * | 10/2007 | Schmitt et al. | 417/470 |
| 2001/0002978 | A1 * | 6/2001 | Siegel et al. | 417/470 |
| 2001/0048884 | A1 * | 12/2001 | Siegel et al. | 417/470 |

FOREIGN PATENT DOCUMENTS

| DE | 197 47 936 A1 | 2/1999 |
|---|---|---|
| DE | 197 50 851 A1 | 2/1999 |

* cited by examiner

*Primary Examiner* — Charles Freay
(74) *Attorney, Agent, or Firm* — Maginot, Moore & Beck

(57) ABSTRACT

The invention relates to a piston pump for conveying a fluid, in particular in a vehicle brake system. The piston pump has a cylinder and a piston movably disposed in the cylinder. A restoring element preloads the piston, and a drive unit for actuates the piston in the cylinder to pump the fluid into a pressure chamber formed in the cylinder. The piston is embodied by a first piston par and a second piston part. The first piston part is a cylindrical body, which can be moved by the drive unit. The second piston part form the piston base, in which four radial inlet openings and one axial connection opening for communication with the pressure chamber are disposed. A flange for the disposition of a seal is disposed on the outer circumference of the piston base element. The openings are simple to make in the face ends and circumferential regions of the second piston part.

10 Claims, 2 Drawing Sheets

PISTON PUMP WITH IMPROVED PISTON

CROSS-REFERENCE TO RELATED APPLICATION

This application is a 35 USC 371 application of PCT/EP 2006/065686 filed on Aug. 25, 2006.

BACKGROUND OF THE INVENTION

1. Field of the Invention

The invention relates to a piston pump for pumping a fluid, having an improved piston, which pump is used in particular in brake systems of vehicles.

2. Description of the Prior Art

Piston pumps are known from the prior art in various versions. Know piston pumps are used for instance in vehicle brake systems that make an active pressure buildup as a function of predetermined driving situations possible. Examples of such brake systems are ABS, ESP or traction control systems. The response performance and pressure buildup of such piston pumps must be quite good, so that a control intervention in the brake system can be made as fast as possible.

In the known piston pumps, pistons are used that implement a delivery of the fluid by the piston. On the one hand, at least one transverse bore and one longitudinal bore must be made in the piston. In addition, the known piston pumps have stepped pistons, for which a very complicated and expensive plunge grinding procedure is required. Thus the known pistons are quite expensive to produce and furthermore have a relatively high flow resistance, because of the deflection of the fluid from the transverse bore into the longitudinal bore.

SUMMARY AND ADVANTAGES OF THE INVENTION

The piston pump of the invention for pumping a fluid has the advantage over the prior art that it can be produced especially simply and economically. Moreover, because of its reduced flow resistance, improved suction performance can be attained. This is attained in accordance with the invention by providing that the piston is formed in two parts and includes a first piston part and a second piston part. As a result, according to the invention, an aspiration path through the piston can be embodied between the first and second piston parts, and complicated piston bores can be dispensed with.

Preferably, the first piston part is a cylinder. As a result, the first piston part can be furnished especially simply and economically. No bores or the like have to made in the first piston part. The first piston pail can be especially simply machined on its outer circumference. Thus in a simple way, a piston with a piston step can be furnished, if the second piston part has a different and in particular larger diameter than the cylindrical first piston part.

Also preferably, the second piston part is a piston base element having at least one inlet opening and a connection opening to a pressure chamber of the piston pump, in which the fluid to be pumped is aspirated. The necessary openings are simple to make in the face ends and circumferential regions of the second piston part.

The inlet opening in the second piston part is preferably disposed laterally, and the connection opening is disposed in the base of the piston base part. If the inlet opening is provided near the base of the second piston part, in the axial direction of the piston, then an extremely short suction region of the piston pump can be achieved, so that flow resistance during the aspiration phase of the piston pump can be reduced significantly. Thus in the invention, the pump efficiency can be increased markedly.

To further reduce the number of parts in the piston pump, an inlet valve seat is preferably additionally formed on the piston base element. The inlet valve seat may for instance be produced by means of ball stamping in the process of assembly of the piston pump. In this process, a ball of an inlet valve stamps a valve seat in the second piston part during the assembly process.

Also preferably, a flange for a seal is formed integrally with the piston base element. Preferably, a step is also formed on the piston base element. The flange for a seal and the step may be formed immediately adjacent one another in the axial direction of the piston.

To enable simple, economical connection of the first and second piston parts, the first piston part and the second piston part are preferably joined by means of a press fit. However, it is also possible to use other connection techniques, such as welding, soldering, adhesive bonding, or caulking.

In an especially preferred feature of the invention, the piston base element includes four connecting regions, between each of which a slitlike inlet opening is formed. The four connecting regions are disposed symmetrically around a center axis of the piston, so that an inflow of fluid is possible from four different directions between the individual connecting regions. It should be noted that more or fewer than four inlet openings may also be provided.

The piston base element is preferably produced as a cold-formed part or as a turned and milled part or as a cast part or as a metal extruded part or as a sintered part or as a plastic injection-molded part.

The present invention also relates to a brake system for vehicles, having a piston pump of the invention. The brake system is embodied preferably as a brake system with active pressure buildup.

DESCRIPTION OF THE PREFERRED EMBODIMENTS

Below, a piston pump 1 in one exemplary embodiment of the invention will be described, in conjunction with FIGS. 1 and 2.

Figure 1:
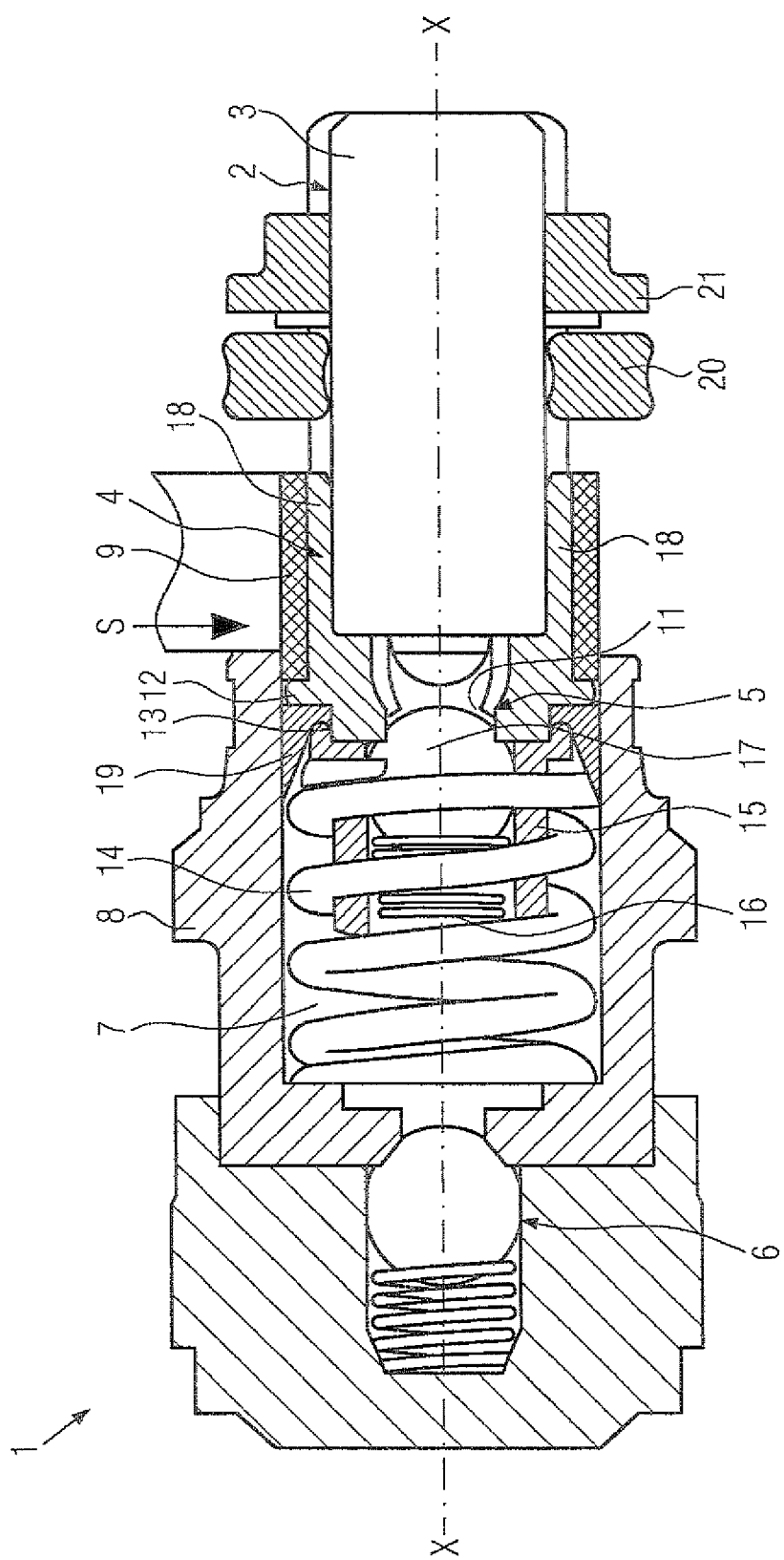
FIG. 1 is a schematic sectional view of a piston pump in one exemplary embodiment of the present invention.

As shown in FIG. 1, the piston pump 1 includes a piston 2 and a cylinder 8. The piston 2 can be driven in a known manner by means of an eccentric element. Upon the piston being driven, fluid is aspirated from the direction of the arrow S radially through a filter 9. The fluid is then delivered into a pressure chamber 7 in the axial direction X-X of the piston. The pressure chamber 7 is disposed in the cylinder 8 between an inlet valve 5 and an outlet valve 6. A restoring spring 14 for the piston is also disposed in the pressure chamber 7.

The inlet valve 5 is embodied as a check valve and includes a cage 15, in which a spring 16 and a ball 17 are disposed. The outlet valve 6 is likewise embodied as a spring-loaded check valve, and it opens as soon as a pressure in the pressure chamber 7 is greater than a spring force acting on the ball of the outlet valve 6.

Figure 2:
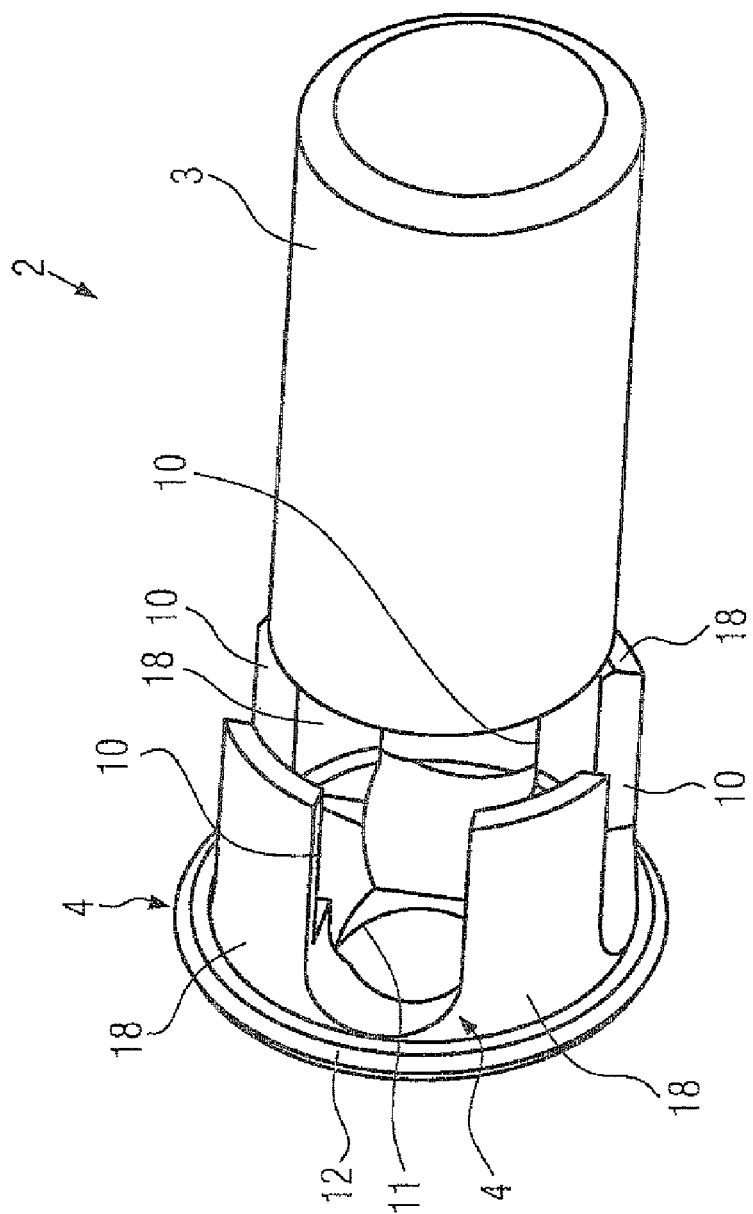
FIG. 2 is a perspective view of the piston show in FIG. 1, with the two piston parts shown in the non-assembled state.

As shown in FIGS. 1 and 2, the piston 2 is formed in two parts, comprising a first piston part 3 and a second piston part 4. The first piston part 3 is a cylindrical body, which can be moved by the eccentric drive mechanism or some other drive mechanism. The first piston part 3 has no bore or the like. The second piston part 4 is a piston base element, in which four radial inlet openings 10 and one axial connection opening 11 for communication with the pressure chamber 7 are disposed. A flange 12 for the disposition of a seal 19 is disposed on the outer circumference of the piston base element. The flange 12 is disposed on a step 13, adjacent to the base of the second piston part 4. Further seals 20, 21 are disposed in a known manner on the first piston part 3.

As shown in FIG. 2, the four inlet openings 10 are disposed symmetrically along the circumference of the piston base part. Between each inlet opening 10 is a respective connecting region 18, by way of which a connection is made between the first piston part 3 and the second piston part 4. The connection between the two piston parts 3, 4 is made by means of a press fit. The circumferential length of an inlet opening 10 is equivalent to a circumferential length of a connecting region 18.

The function of the piston pump 1 of the invention is as follows: During the intake stroke of the piston 2, fluid is introduced through the filter 9 in the direction of the arrow S radially through the inlet openings 10 and the connection opening 11 into the pressure chamber 7. Once top dead center is reached, the direction of motion of the piston 2 is reversed, so that the inlet valve 5 closes the connection opening 11 of the second piston part 4. A pressure buildup now ensues in the pressure chamber 7, until such time as the pressure in the pressure chamber 7 is greater than a spring force of the outlet valve 6. Once that is the case, the outlet valve 6 opens, so that the fluid under pressure can be delivered from the pressure chamber 7 into an outlet line (not shown). Once bottom dead center is reached, the direction of motion of the piston 2 is reversed again, so that the outlet valve 6 closes again, and the intake stroke begins again. A restoring force of the restoring spring 14 presses against the cage 15 of the inlet valve 5, which cage is braced on the step 13, in order to return the piston 2 to its previous position.

Because of the two-part embodiment of the piston 2, it is thus possible to dispense with complicated longitudinal bores and transverse bores in the piston. An inlet path for the fluid, which extends through the second piston part 4, is also quite short, and because of the embodiment with four inlet openings 10, it is quite large (half of the outer circumference), so that flow resistance in the intake phase can be minimized. As a result, the piston pump 1 of the invention can be supplied faster and attains significantly improved pressure buildup dynamics. The piston of the invention can be put together simply and can be installed in the piston pump 1 equally simply. The first piston part 3 in particular can be produced quite economically, for instance by being cut from rod material. If moreover the second piston part 4 is produced as a plastic injection-molded part or as a cold-formed part, then metal-cutting machining can moreover be dispensed with entirely. The piston pump of the invention is used especially preferably in conjunction with brake systems of vehicles, especially those with active pressure buildup, such as ABS, ESP, traction control, and/or electrohydraulic brake systems.

The foregoing relates to the preferred exemplary embodiments of the invention, it being understood that other variants and embodiments thereof are possible within the spirit and scope of the invention, the latter being defined by the appended claims.

The invention claimed is:

1. A piston pump for pumping a fluid, comprising:
a cylinder structure defining a cavity;
a piston at least partially disposed movably in the cavity, the piston including a first piston part and a second piston part; and
a restoring element located in the cavity and arranged to prestress the piston;
wherein the second piston part includes (i) a base, and (ii) a plurality of cantilevered members projecting from said base so as to define a fluid space and a mounting space therebetween,
wherein the plurality of cantilevered members includes (i) a first cantilevered member projecting from said base and terminating in a first free end, and (ii) a second cantilevered member projecting from said base and terminating in a second free end,
wherein (i) the first cantilevered member includes a first support ledge facing the mounting space, the first support ledge being spaced apart from the first free end, and (i) the second cantilevered member includes a second support ledge facing the mounting space, the second support ledge being spaced apart from the second free end,
wherein the first piston part includes a substantially cylindrical body that extends into the first piston part so as to be located in the mounting space and positioned in contact with the first support ledge and the second support ledge, and
wherein the first cantilevered member, the second cantilevered member, and the substantially cylindrical body defines a radial inlet of the piston.

2. The piston pump according to claim 1, wherein:
the base of the second piston part defines a fluid outlet, and
the piston is configured to define a fluid path therethrough that includes the radial inlet, the fluid space, and the fluid outlet.

3. The piston pump according to claim 2, wherein the plurality of cantilevered members encompasses at least half of the circumference of the second piston part.

4. The piston pump according to claim 1, wherein the base of the second piston part further defines an inlet valve seat.

5. The piston pump according to claim 1, wherein the base of the second piston part includes a flange, further comprising:
a seal supported on the flange.

6. The piston pump according to claim 1, further comprising a step formed on the second piston part.

7. The piston pump according to claim 1, wherein the first piston part is joined to the second piston part by a press fit.

8. The piston pump according to claim 1, further comprising:
a drive mechanism configured to move the piston in the cavity of the cylinder, wherein the first piston part is driven by the drive mechanism,
wherein the second piston part is produced as a cold-formed part or as a turned and molded part or as a cast part or as a plastic injection-molded part.

9. The piston pump according to claim 1, wherein:
the substantially cylindrical body has a first end located in the cavity and a second end located outside of the cavity,
the first end, when viewed in a sectional view, defines a line, and
the radial inlet of the piston is position entirely on one side of the line, and
the substantially cylindrical body is positioned entirely on an opposite side of the line.

10. The piston pump according to claim 9, wherein the line is aligned with the first support ledge and the second support ledge.

\* \* \* \* \*